United States Patent
Havens et al.

(10) Patent No.: US 9,275,388 B2
(45) Date of Patent: Mar. 1, 2016

(54) TRANSACTION TERMINAL WITH SIGNATURE CAPTURE OFFSET CORRECTION

(75) Inventors: William H. Havens, Syracuse, NY (US); Richard A. Romanchik, Rochester, NY (US)

(73) Assignee: Hand Held Products, Inc., Skaneateles Falls, NY (US)

(*) Notice: Subject to any disclaimer, the term of this patent is extended or adjusted under 35 U.S.C. 154(b) by 2158 days.

(21) Appl. No.: 11/344,267

(22) Filed: Jan. 31, 2006

(65) Prior Publication Data

US 2007/0175987 A1 Aug. 2, 2007

(51) Int. Cl.
*G06Q 20/40* (2012.01)
*G06Q 20/20* (2012.01)

(52) U.S. Cl.
CPC .......... *G06Q 20/40145* (2013.01); *G06Q 20/20* (2013.01)

(58) Field of Classification Search
CPC .......................... G06Q 20/20; G06Q 20/40145
USPC .......... 382/119, 186; 705/17, 24, 39; 345/156
See application file for complete search history.

(56) References Cited

U.S. PATENT DOCUMENTS

| | | | | |
|---|---|---|---|---|
| 4,817,034 A | * | 3/1989 | Hardin et al. | 345/173 |
| 5,479,530 A | * | 12/1995 | Nair et al. | 382/119 |
| 5,848,187 A | * | 12/1998 | Bricklin et al. | 382/187 |
| 6,155,560 A | * | 12/2000 | Cote et al. | 271/225 |
| 6,539,363 B1 | * | 3/2003 | Allgeier et al. | 705/39 |
| 2004/0156537 A1 | * | 8/2004 | Chung et al. | 382/119 |

* cited by examiner

*Primary Examiner* — Kumar Patel
*Assistant Examiner* — Insa Sadio
(74) *Attorney, Agent, or Firm* — Additon, Higgins, & Pendleton, P.A.

(57) ABSTRACT

A method of processing a transaction comprising the steps of generating a position signal indicative of position of a touching of a touch screen having a transparent reference surface, displaying an image of the touching of the screen responsive to the position signal, and changing the image as a function of the difference between the position signal and a predetermined position value.

27 Claims, 5 Drawing Sheets

TRANSACTION TERMINAL WITH SIGNATURE CAPTURE OFFSET CORRECTION

FIELD OF THE INVENTION

This invention relates generally to a transaction terminals having touch sensitive screens for signature capture.

BACKGROUND OF THE INVENTION

Transaction terminals are in use today at locations where a person makes a transaction in a retail store, restaurant and the like. Most of the terminals have a card reading capability for acquiring both debit and credit card data. Typically, the card is drawn through a slot in the terminal and the card related data is applied to a microprocessor which identifies the card owner, processes the necessary data to complete the transaction and generates a sale slip. Sometimes as part of the transaction, the card user is asked to sign his or her name upon a signature capture pad and the signature is electronically recorded as part of the transaction. Other times the card user is asked to input data through some type of real or virtual keypad.

The capture pad employed in many transaction terminals typically includes a glass substrate that is separated from a deformable polyester cover by relatively small non-conductive spheres. The opposing surfaces of the substrate and the cover sheet are coated with a conductive material. The coated surfaces are, in turn, connected to lead lines that surround the capture pad. The lead lines are connected to an x-y register that is arranged to record the signature data and forward the data to a microprocessor. The customer writes his or her signature on the pad using a plastic stylus or a similar instrument having a point which is capable of forcing the conductive surface on the cover sheet at the contact point against the conductive coating upon the substrate thus electronically recording the signature.

Transaction terminals of the type having a data collection input and display capabilities for attachment to a network are growing in popularity. Currently available transaction terminals have been observed to exhibit numerous limitations. Efforts regarding such systems have led to continuing developments to improve their versatility, practicality and efficiency.

DETAILED DESCRIPTION

Reference will now be made to exemplary embodiments of the invention which are illustrated in the accompanying drawings. This invention, however, may be embodied in various forms and should not be construed as limited to the embodiments set forth herein. Rather, these representative embodiments are described in detail so that this disclosure will be thorough and complete, and will fully convey the scope, structure, operation, functionality, and potential of applicability of the invention to those skilled in the art. Wherever possible, the same reference numbers will be used throughout the drawings to refer to the same or like parts.

A transaction terminal in accordance with the invention may be adapted for reading card information for secure receipt of personal identification (PIN) information, for signature capture, and numerous other functions. Cards which may be processed by a transaction terminal may be, for example, a credit card, a debit card, customer loyalty card, an electronic benefits card, a company-sponsored benefits card, an identification card, etc. A detailed description of transaction terminals and their operation is disclosed in commonly owned published United States Patent Application Publication No. 20030132292, which is hereby incorporated herein in it's entirety.

Figure 1:
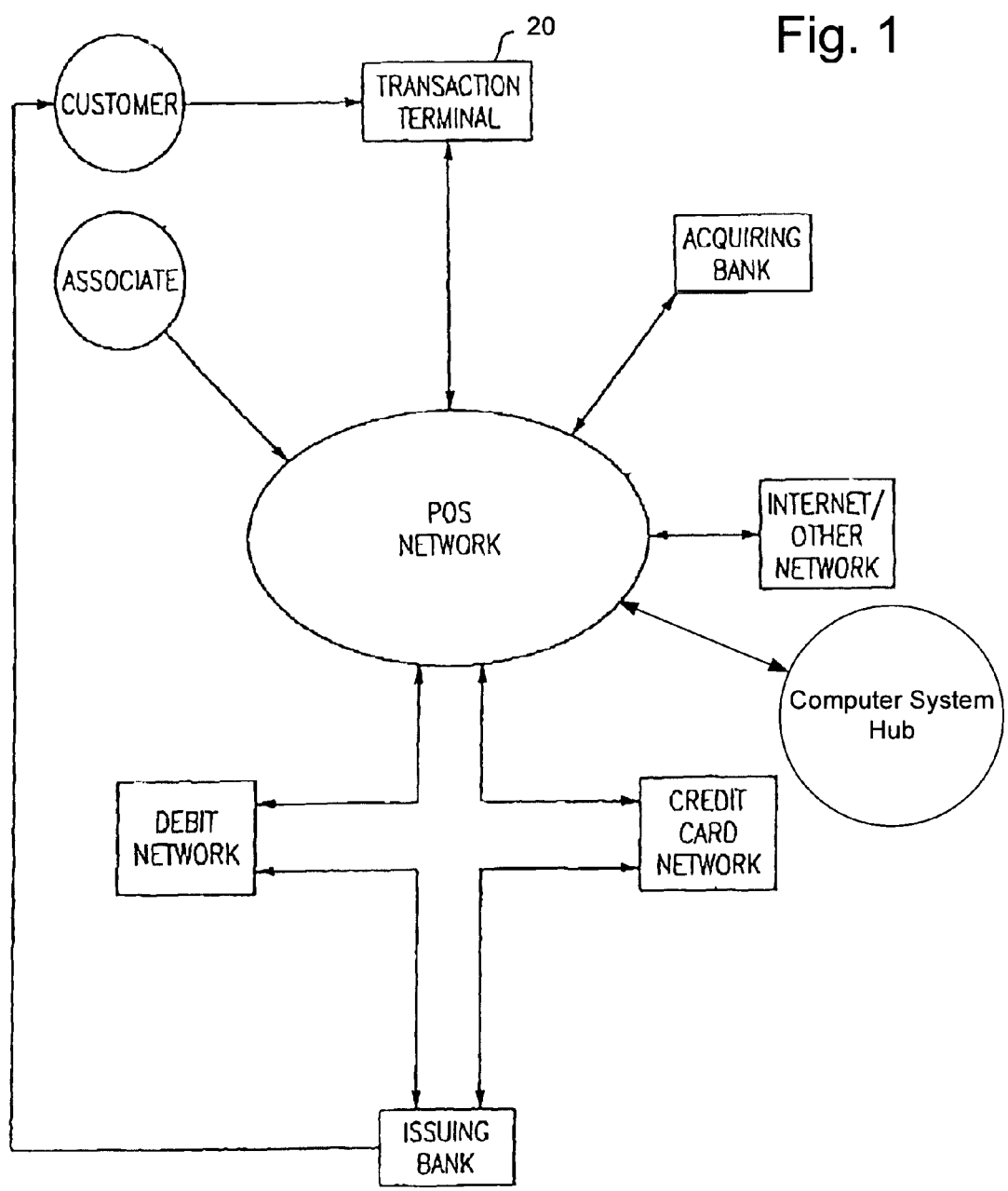
FIG. 1 is a block diagram of a network for utilizing a transaction terminal in accordance with the present invention.

FIG. 1 illustrates an environment in which a transaction terminal 20 may operate in accordance with the invention. Typically, transaction terminals are disposed in a retail store kiosk, customer service desk or other locations where customers do business. When a customer makes a transaction using a credit card or a debit card, an electronic benefits card or customer loyalty card, a customer inserts or places a card in or near a reader to read the card. The customer may be prompted to write a signature on the terminal 20 so that it can capture the signature digitally.

Transaction terminal 20 communicates transaction information, such as the captured signature, to a network. Networks take on a variety of forms including a dial-up or cable modem interfaces, USB interfaces, ethernet interfaces including wireless and non-wireless which enable communication with external computer systems or other communication devices. For instance, transaction terminals may communicate with one cash register which is one of several cash registers that is in communication with a server, in an in-store local area network (LAN) which may be in communication with a debit network and credit card network.

The network can also be considered to include various computer systems operated by parties other than a retailer or for example, a network can include a distribution network operated by distribution service providers who receive transactional data from a retailer and evaluate the availability of several debit or credit card networks and route the data to one selected debit or credit card networks or based on an established criteria. Some transactions are processed without being routed through distribution networks and others are normally dependent on the selection made by a retailer.

The network may include at least one computer system hub (not shown) which is under the control of a retailer yet located off-site with respect to the transaction terminal and other in-store devices such as cash registers or other transaction terminals and servers. The hub may be in communication with, and may be adapted to monitor and control financial data transaction emanating from a plurality of in-store servers controlled by a retailer that operates several stores at several different locations. Further, there may be more than a layer of hubs. A retailer may operate a local hub which receives transactional data from each of several in-store servers located at several different stores located in a given municipality. Several of these local hubs, in turn, may transmit transactional data to a regional hub. Several regional hubs may transmit transactional data to a centralized national hub. Several national hubs, in theory, can transmit transaction data to a single world-wide hub operated by a retailer having retail stores worldwide. It is seen that hubs and the layering of hubs provide a means for retailers to monitor transactions conducted throughout several retail stores.

Hubs are often owned and operated by a retailer who owns or operates a retail store in which the transaction terminal is located. However, the Hub may also be owned by a third party service provider, and the retail store owner may subscribe to a processing service provided by the third party. Such third-party operated hubs operated in the interest of a retailer shall herein be considered to be operated by a retailer.

The network may be in communication with another computer Network, which may be the internet (World Wide Web). Connecting networks facilitates ready access to information from a wide variety of computer databases, which information is pertinent to financial transactions. For example, a network can access such information as drivers license identification information, consumer credit rating information, consumer criminal record information, sales history information, consumer demographic data, and other consumer information.

Figure 2:
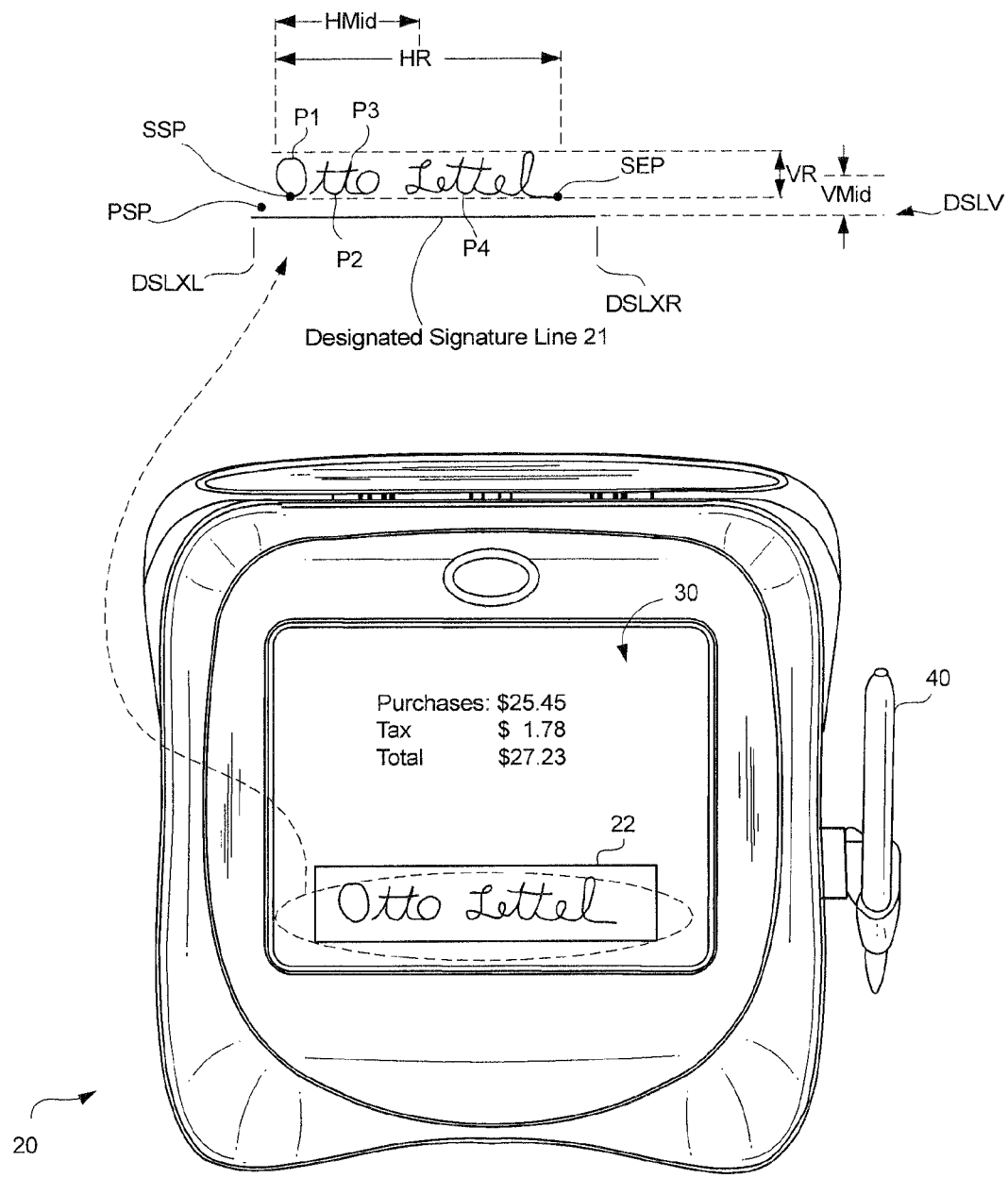
FIG. 2 is a top view of a transaction terminal in accordance with the present invention.

FIG. 2 illustrates a transaction terminal 20 which includes a housing having a top, a bottom, a front, and sides. Integrated in the top of terminal 20 is a touch screen display assembly 30 comprising a display and a touch screen sensitive overlay disposed over the display. Disposed in the housing may be one or more readers for obtaining information from an information bearing device, such as a card having a magnetic strip, symbol indicia such as a bar code, an RFID instrument, biogenic information such as a fingerprint, etc. Another user interface data input device which may be disposed in terminal 20 is an optical reader unit or imaging assembly, such as a model IT 4000 or IT 4200 optical reader module with decode output circuit of the type available from Hand Held Products, Inc., as are substantially described in United States Patent Application Publication No. 20030029917 entitled "Optical Reader Imaging Module" incorporated herein by reference and U.S. Pat. No. 6,832,725 entitled "Optical Reader Comprising Multiple Color Illumination" also incorporated herein by reference.

A stylus 40 may be included which is disposed in a specially configured holder apparatus adapted for attachment either on the housing or elsewhere. Terminal 20 further includes I/O connection ports (not shown) for allowing communication with other computer systems such as cash registers, or other host computer systems, e.g., server system, or hub computer systems as described herein.

Figure 3:
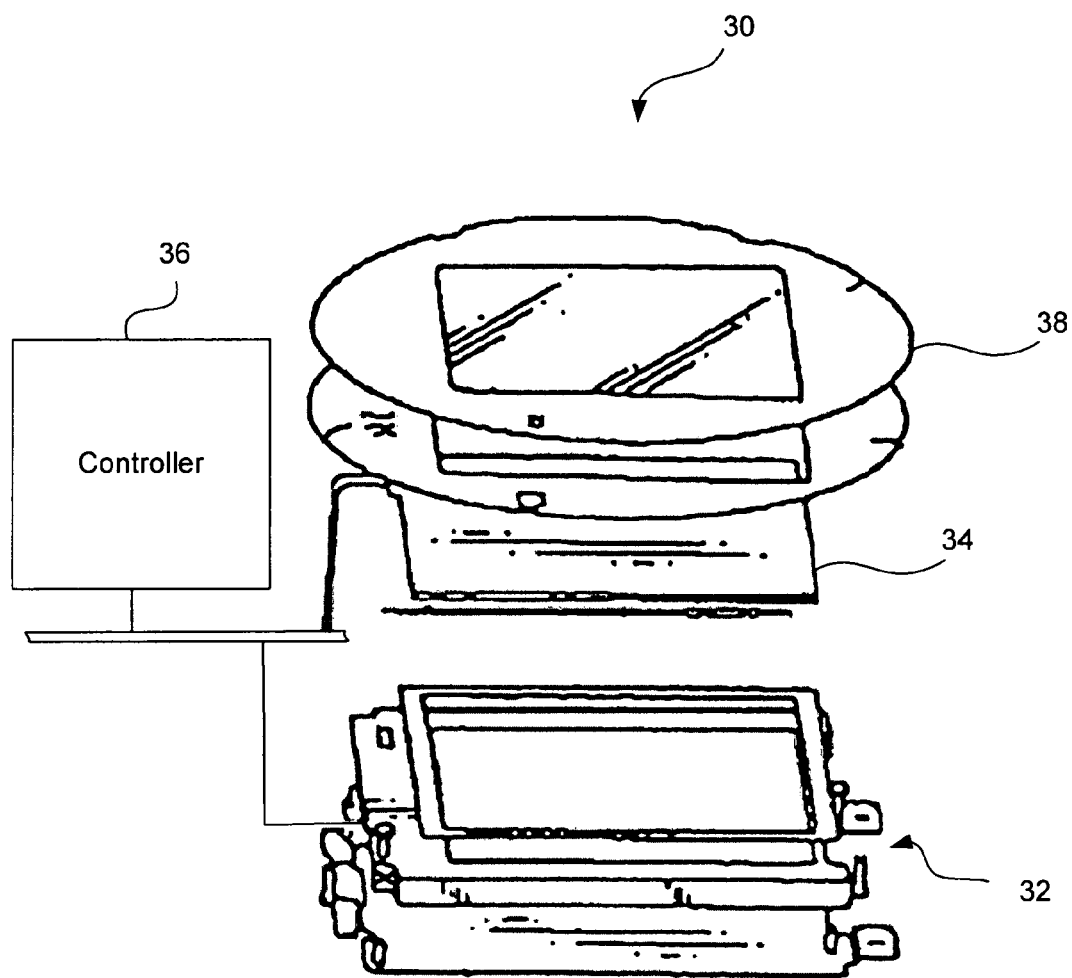
FIG. 3 is a simplified diagram of a touch pad for a transaction terminal in accordance with the present invention.

FIG. 3 illustrates a touch screen display assembly 30 which may comprise a display 32 in combination with a touch screen 34.

Touch screen or pad 34 is a transparent device for generating a position signal indicative of position of a touching of a top reference surface of the screen and may be, for example, part no. N010-0518-T401 manufactured by Fujitsu, or part no. RTC-A1 from Nissha, or part no. NIS/RC-872 from Nissha. Touch screen 34 may have a protective overlay 38. Touch screens typically operate in association with a touch screen controller 36. Data entry on the screen may be made by a finger, stylus, or other device.

Display 32 is responsive to the position signal from the touch screen 34 to provide a visual simulation of the touching of the screen and may be, for example, a 5.7", ¼VGA (320 pixels by 240 pixels) resolution color or monochrome LCD display of the type available from Nan Ya Corporation, and may be driven by an appropriate controller.

Controller 36 controls, amongst other things, the touch pad so that the display changes the visual simulation based on a number of factors, including the difference between a function of the position signal from the touch screen and a predetermined position value, as will be described in further detail.

The touch screen in accordance with the present invention is an touch sensitive overlay element capable of providing a signal representative of the position of a stylus or other device placed in contact therewith. Broadly speaking, during operation of the touch screen, the stylus acts as a probe causing the top and bottom conductive layers of the touch screen to contact each other at the point of contact. The differing potentials between sides of the element, in two coordinate directions, are measured, converted into a signal, such as a digital form, and are processed through correction algorithms. This enables a trace of the movement of the stylus to be captured and retained.

Positioned beneath the touch screen and having a display visible therethrough is a display module (such as a LCD module) which is capable of displaying information in response to electrical signals applied thereto. Electrical signals from the touch screen relating to movement of the stylus on the element can then be applied to the display module to provide a representation of hand written information, such as a signature on the display. Thus, since the display module is positioned beneath the transparent touch screen, the movements of the stylus on the transparent surface are graphically captured and are immediately visible at the points of contact (or elsewhere if an offset is introduced) of the stylus with the surface.

Such touch screens sometimes have to go through a calibration cycle to correct for the small differences between individual touch screens and/or displays in order to correct for location differences between where the stylus is contacting the touch screen and where the display displays the visual representation thereof. This difference may be referred to as offset. Sometimes, though the calibration is not performed, or is incorrectly done, or is unintentionally set to an incorrect value. Also, the offset may change with time, with the result being that the projected image on the display of the signature does not align with the location of the stylus or signing tool.

In accordance with the invention, touch screen X, Y position coordinates are automatically sensed or determined. Such coordinates may indicate where a signature starts, when the signature is started where the signature ends, when the signature ends, local maxima, local minima, etc. These coordinates are stored in memory and then compared with a predetermined or expected position. The predetermined position may be where statistically someone is expected to sign their name on the display, such as on a signature line or in a box also created on the display by the controller. If the expected and actual signing locations are not in agreement, then an offset correction value may be generated that would cause the displayed signature to migrate closer to the expected location. This correction can be made for offsets in both the horizontal and vertical directions.

Referring to FIG. 2, a customer virtually signs on the touch screen 30 on a predetermined virtual designated signature line 21 or in a signature box 22, also referred to as a virtual signature placement element. Let the vertical coordinate of the line or bottom line of the box be DSLV and the left and right end points of the line or box be DSLXL and DSLXR respectively. The point at which the person begins writing is referred to as the signature start point (SSP). The point at which the person stops signing is referred to as the signature end point (SEP). These points can be described in X and Y coordinates (XSSP, YSSP, XSEP, YSEP). Each signature has a plurality of maxima peaks (e.g. P1, P3) and minima peaks (e.g. P2, P4) that may be collected in an alternating fashion. The maxima peaks may be averaged to provide a maxima average peak (MaxAvgPeak) and a minima average peak (MinAvgPeak). From these, a theoretical vertical signature range VR for a particular signature may be determined by the following equation.

$$VR = MaxAvgPeak - MinAvgPeak$$

The midpoint Vmid of the vertical signature range relative to the designated display line or bottom of the signature box may be determined by the following equation.

$$Vmid = MinAvgPeak + VR/2 - DSLV$$

Other ways of determining Vmid are also contemplated. For example, ilt may be the average of all vertical measurements reduced by DSLV, or the sum of the maximum peak minus the minimum peak reduced by DSLV. Other signature location metrics may also be utilized and are contemplated to be within the scope of the present invention.

A theoretical horizontal signature range HR for a particular name may be determined in a similar manner but in the horizontal direction, and may be based upon the signature horizontal start and end points, XISP and XISE, relative to DSLXL and DSLXR respectively of either the designated signature line or the signature box. The midpoint Hmid of the horizontal signing range may be determined in a manner similar to Vmid. In another exemplary embodiment, HR may be the starting horizontal position XISP.

A VmidNominal may be established by determining the average Vmid of actual signatures of an ensemble of people. This is the vertical predetermined position value. This determination may be made empirically by having a plurality of individuals (for example 200 people) write their signature and then perform the appropriate measurements on those signatures. VmidNominal would be stored in permanent memory. In a similar fashion a HmidNominal a horizontal predetermined position value can be determined.

A new vertical offset correction value, VOVnew, may then be determined by the following equation.

$$VOVnew = VmidNominal - Vmid$$

The VOVnew or an appropriately scaled function of VOVnew may be added to all new X coordinates provided by the touch screen in order for the display to "move" the location of a viewed or displayed signature closer to the point the stylus is touching the touch screen in a vertical direction. The same algorithm may be utilized to provide a horizontal offset correction value HOVnew to move a person's displayed signature closer to the point the stylus is touching the touch screen in a horizontal direction. In either case, the correction value would be stored in memory to be used to correct the offset the next time a signature is captured.

It is to be noted that determination of the VOVnew and HOVnew may be done iteratively or in increments in order to minimize dramatic changes in the displayed signature's location. In other words, Vmid and therefore VOVnew might change as more data points are collected as a person continues to write and so the position displayed may change incrementally the apparent point the stylus is touching the touch screen. To this end, the position of the displayed signature may be changed incrementally with a single VOVnew determination to make movement of the displayed signature imperceptible to the signatory. Also, in an alternate implementation, the VmidNominal may be adjusted over time as a moving average as the number of exemplary signatures grows.

An average VOVnewUpdated may be created to reduce the display correction from being overly effected by a single signature. This averaging might be accomplished by calculating an updated average correction VOVnew after the completion of each signature signing. An example of how this determination of an updated VOVnew is calculated as described by the following equation based upon the previous VOVnew generated after the previous signature was captured and VOVnew current which is based upon the current signature.

$$VOVnewUpdated = (VOVnewPrevious \times 127 + VOVnewCurrent)/128$$

In this manner, only $1/128^{th}$ of the VOVnew is used to correct the vertical offset as a result of any single signature measurement, thereby generating a slowly varying correction term that would on average converge to a properly corrected system.

Figure 4:
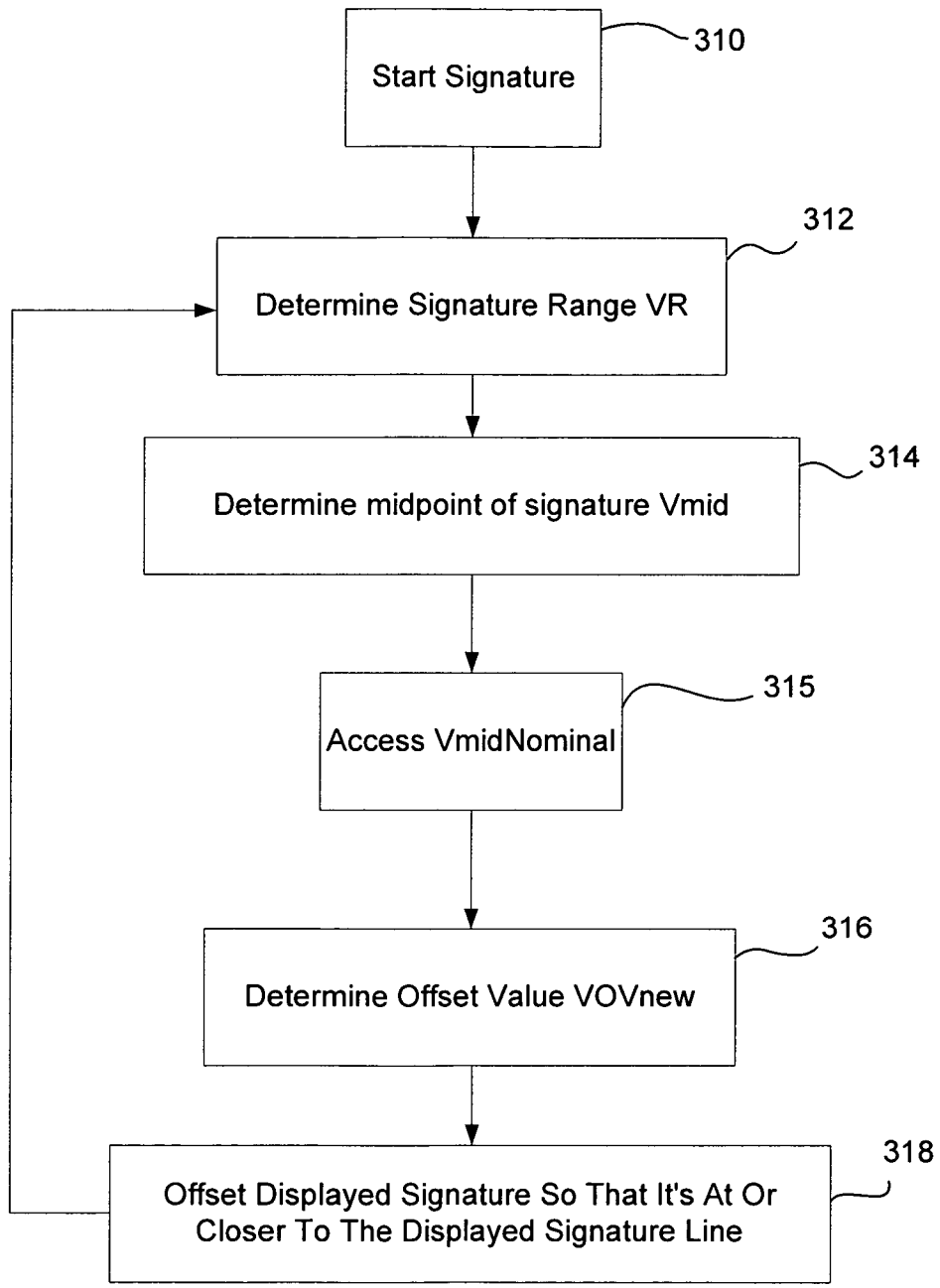
FIG. 4 is a flowchart for operating a transaction terminal in accordance with the present invention.

Referring to FIG. 4, a flowchart in accordance with the present invention begins with a step 310 wherein a signature is started. Vertical signature range VR is determined in a step 312. The vertical midpoint of signature Vmid is determined in a step 314. VmidNominal is taken from memory (or possibly as calculated over a very large sample of signatures as an ongoing activity in an independent background process) in a step 315. The offset or correction value VOVnew is then determined in a step 316. The displayed signature is offset or moved as a function of that value in a step 318. A similar flowchart can be created to correct for an offset in a horizontal direction.

Alternately VOVnew may also be derived as a function of a comparison of the actual ISP (Initial Starting Point) versus a nominal or predetermined ISP. The nominal ISP may be determined by averaging the ISP for a sample of signatures.

Figure 5:
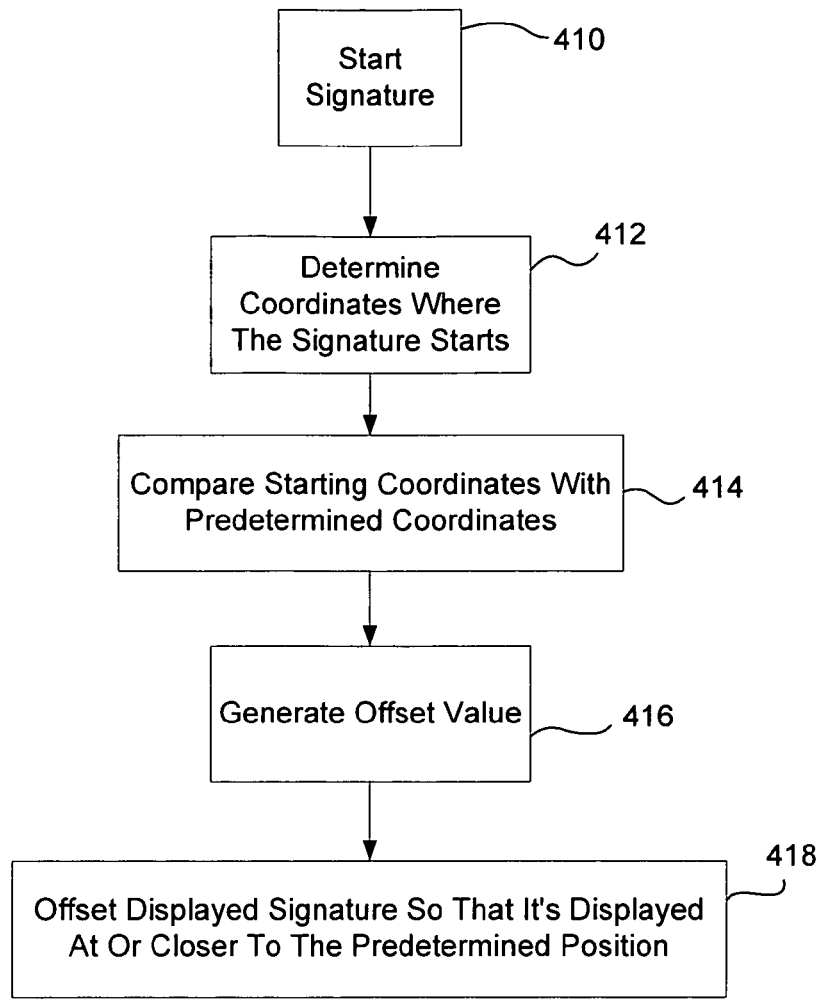
FIG. 5 is a flowchart for operating a transaction terminal in accordance with the present invention.

Referring to FIG. 5, a flowchart in accordance with another exemplary embodiment of the present invention begins with a step 410 wherein a signature is started. A signature start might be detected by keeping track of when the display is first contacted, or a first contact detection followed by continued contact for a predetermined amount of time. The signature initial start point (ISP) coordinates (XISP, YISP) are determined in a step 412. The ISP coordinates are compared with a signature predetermined starting point (PSP) and its coordinates (XPSP,YPSP) in a step 414. These predetermined coordinates values may be representative of the average signature starting point coordinates used by a sample number of persons when starting signatures.

Since an expected predetermined starting location will only be an average position, the location of the displayed signature might be changed only by a fraction of the generated offset values, so that the change in location of the displayed signature is not overly compensated or dramatic. To this end, the position of the displayed signature may be changed incrementally to make movement of the displayed signature appear as imperceptible to the signatory.

In an exemplary embodiment, the predetermined signature starting point might also be derived from the average or nominal starting point coordinates for each particular customer name, which is known because the customer has previously provided it. In this manner, different names would have different PSPs, because people start writing their signatures in different locations on a given line or in a given signature box. For instance, a signature beginning with the letter T will most likely start on a different ISP than a signature starting with the letter G. To this end, the size of an expected virtual signature box or line may be determined from the average signing parameters for various names. The virtual box would be an area where the signature might be expected to fill. The displayed signature line or displayed signature box might be adjusted accordingly to account for expected signature sizes and locations.

It is to be noted that the present invention changes the position or location of a displayed mark or writing (such as a signature) relative to a displayed signature line or displayed signature box in order to cause a displayed point to coincide with position of the touching of the touch pad by the stylus.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

It should also be understood that the illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

The invention claimed is:

1. A transaction terminal comprising:
   a touch screen having a transparent reference surface for generating a position signal indicative of position of a touching of the screen;
   a display that is under the transparent reference surface that is responsive to an input signal which creates a image on the display; and,
   a controller for capturing position signals and generating the input signal, the input signal being a function of the captured position signals and a predetermined position value signal that is indicative of a predetermined position where a person is expected to sign on the display and generating an offset correction value to cause a displayed signature to migrate closer to the predetermined position,
   wherein the image changes position on the display during the capture of the position signals.

2. A transaction terminal in accordance with claim 1, wherein the predetermined position value is a function of a nominal signature characteristic determined from a sample of signatures.

3. A transaction terminal in accordance with claim 2, wherein the sample of signatures is at least 10 signatures.

4. A transaction terminal in accordance with claim 2, wherein the function is a summation function.

5. A transaction terminal in accordance with claim 1, wherein the predetermined position value signal is a function of a position of a designated signature placement element.

6. A transaction terminal in accordance with claim 1, wherein there is an offset between a position signal and a corresponding part of the image on the display such that the offset correction value is determined by as a function of the predetermined position value adjusted by the maxima average peak and minima average peak of the generated position signals.

7. A transaction terminal in accordance with claim 1, wherein the image changes position iteratively as the signature is made.

8. A transaction terminal in accordance with claim 1, wherein the controller changes the position of the image incrementally.

9. A transaction terminal in accordance with claim 1, wherein the transaction terminal is a point of sale terminal.

10. A transaction terminal in accordance with claim 1, wherein the touching is performed with a stylus.

11. A method of processing a transaction comprising the steps of:
   generating a position signal indicative of position of a touching of a touch screen having a transparent reference surface;
   displaying an image of the touching of the screen responsive to a function of the position signal; and,
   capturing position signals and generating an input signal, the input signal being a function of the captured position signals and a position value signal indicative of a predetermined position where a person is expected to sign on the display and generating an offset correction value to cause a displayed signature to migrate closer to the predetermined position,
   wherein the image changes position on the display during the capture of the position signals.

12. A method of processing a transaction in accordance with claim 11, wherein the predetermined position value is a function of a nominal signature range midpoint determined from a sample of signatures.

13. A transaction terminal in accordance with claim 12, wherein the sample of signatures is at least 10 signatures.

14. A transaction terminal in accordance with claim 11, wherein the predetermined position value is a function of a designated signature line.

15. A transaction terminal in accordance with claim 11, wherein the offset correction value is determined by as a function of the predetermined position value adjusted by the maxima average peak and minima average peak of the generated position signals.

16. A transaction terminal in accordance with claim 11, wherein the function is performed iteratively as the signature is made.

17. A transaction terminal in accordance with claim 11, wherein the controller changes the position of the image incrementally.

18. A transaction terminal in accordance with claim 11, wherein the transaction terminal is a point of sale terminal.

19. A transaction terminal in accordance with claim 11, wherein the touching is performed with a stylus.

20. A transaction terminal in accordance with claim 11, wherein the difference is a summation function.

21. A method of processing a transaction comprising the steps of:
   activating a display to present an image on the display to assist a person to sign the display;
   displaying a virtual signature placement element at a predetermined position where a person is expected to sign the display;
   manually moving a stylus in a cursive manner corresponding to the writing of the person's signature;
   sensing a series of positions of the stylus and generating a series of corresponding position coordinates;
   creating a digital record of the signature by storing the coordinates in memory;
   causing the display to display an image of the signature concomitantly with movement of the stylus;

changing the position of the image of the signature as a function of the difference between the series of corresponding position coordinates and the predetermined position value during the capture of the signature.

22. A method in accordance with claim 21, wherein the predetermined position value is representative of average signature coordinates used by signatories.

23. A method in accordance with claim 21, wherein the predetermined position value is derived from the average coordinates for a characteristic of each particular customer name.

24. A method in accordance with claim 21, wherein the position of the image is changed incrementally.

25. A method in accordance with claim 21, wherein the position of the image is changed in two directions.

26. A transaction terminal comprising:
   a touch screen having a transparent reference surface for generating a position signal indicative of position of a touching of the screen;
   a display that is under the transparent reference surface that is responsive to an input signal which creates a image on the display; and,
   a controller for capturing position signals and generating the input signal, the input signal being a function of the captured position signals and a predetermined position signal where a person is expected to sign on the display and generating an offset correction value to cause a displayed signature to migrate closer to the predetermined position,
   wherein the image changes position on the display during the capture of the position signals.

27. A method of processing a transaction comprising the steps of:
   generating a position signal indicative of position of a touching of a touch screen having a transparent reference surface;
   displaying an image of the touching of the screen responsive to a function of the position signal; and,
   capturing position signals and generating an input signal, the input signal being a function of the captured position value signals and a predetermined position value signal where a person is expected to sign on the display and generating an offset correction value to cause a displayed signature to migrate closer to the predetermined position,
   wherein the image changes position on the display during the capture of the position signals.

* * * * *